United States Patent [19]
Gain, Jr.

[11] 4,411,288
[45] Oct. 25, 1983

[54] VALVE POSITION INDICATOR WITH VARIABLE INDICATOR PLATES

[75] Inventor: Lorand H. Gain, Jr., Montgomery, Ill.

[73] Assignee: AMSTED Industries Incorporated, Chicago, Ill.

[21] Appl. No.: 287,423

[22] Filed: Jul. 27, 1981

[51] Int. Cl.³ .......................... F16K 1/28; F16K 37/00
[52] U.S. Cl. ..................... 137/363; 137/553; 116/277; 116/DIG. 21
[58] Field of Search ...................... 137/363, 551, 553; 116/277, 292, DIG. 21

[56] References Cited

U.S. PATENT DOCUMENTS

| | | | |
|---|---|---|---|
| 2,767,681 | 10/1956 | Pontius | 116/277 |
| 2,984,127 | 5/1961 | Schwenk | 116/277 |
| 3,505,972 | 4/1970 | Benjamin | 116/277 |
| 3,656,504 | 4/1972 | Topinka | 137/363 |

*Primary Examiner*—A. Michael Chambers
*Attorney, Agent, or Firm*—Fred P. Kostka; Edward J. Brosius

[57] ABSTRACT

This invention relates to a valve position indicator for buried valves having a rotatably operated shaft extended to ground level. A sealed gear box unit non-rotatably mounted inside the valve position indicator has a transmission mechanism mounted about the operator shaft to effectively move an indicating device at a predetermined arc distance for every shaft revolution. Adjustable indicator plates are angularly disposed on the cover of the gear box unit to provide open and closed reference points for the indicating device. The plates are securable in a manner to permit application to valves requiring different number of turns to move the valves between their open and closed positions.

4 Claims, 8 Drawing Figures

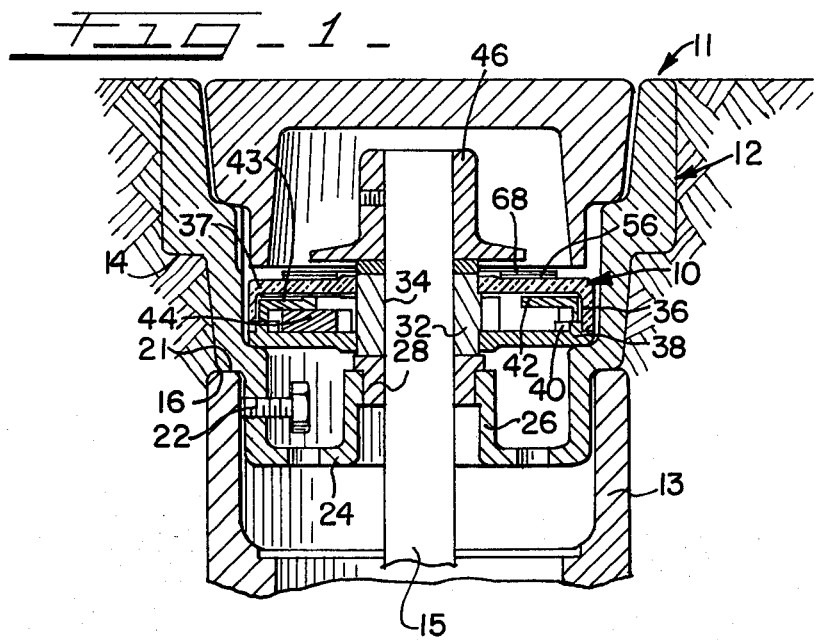
FIG-1-
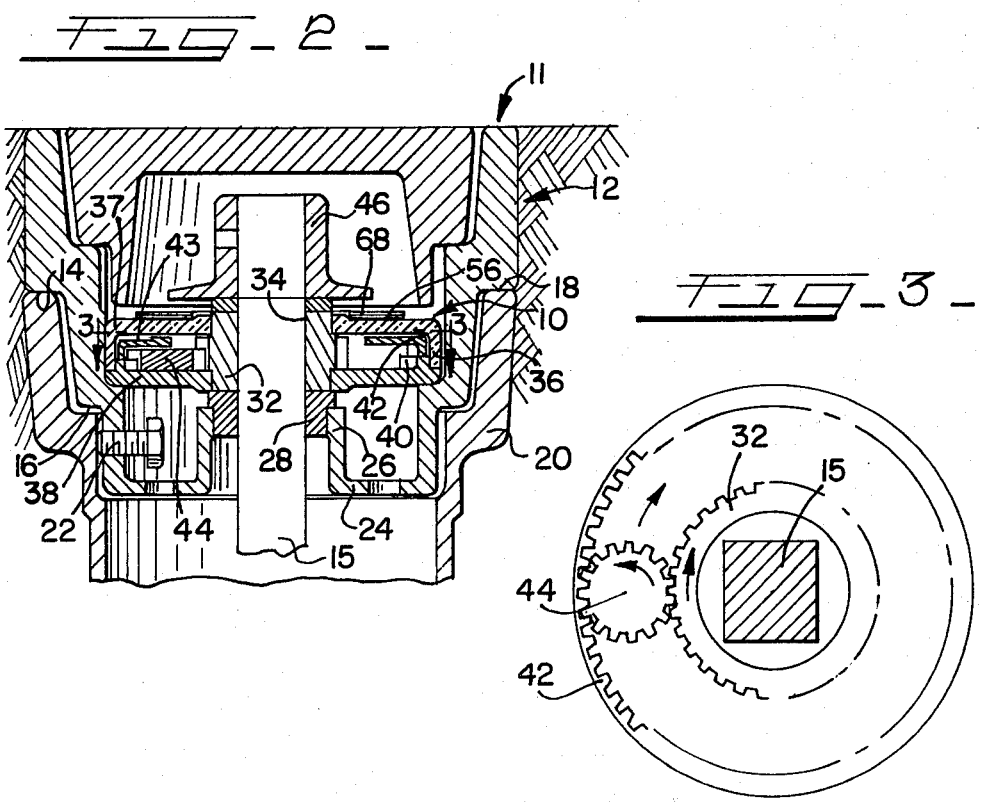
FIG-2-
FIG-3-

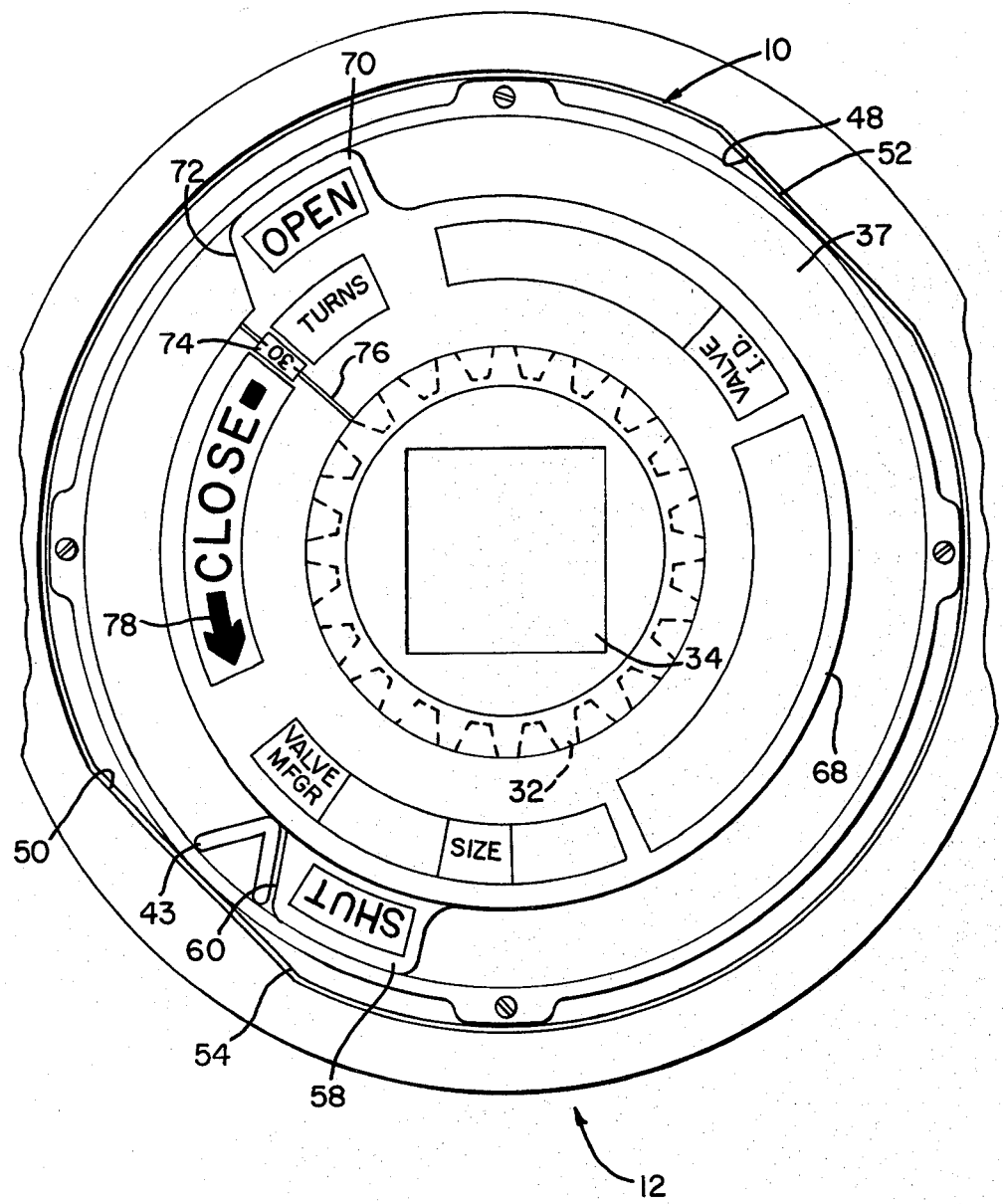

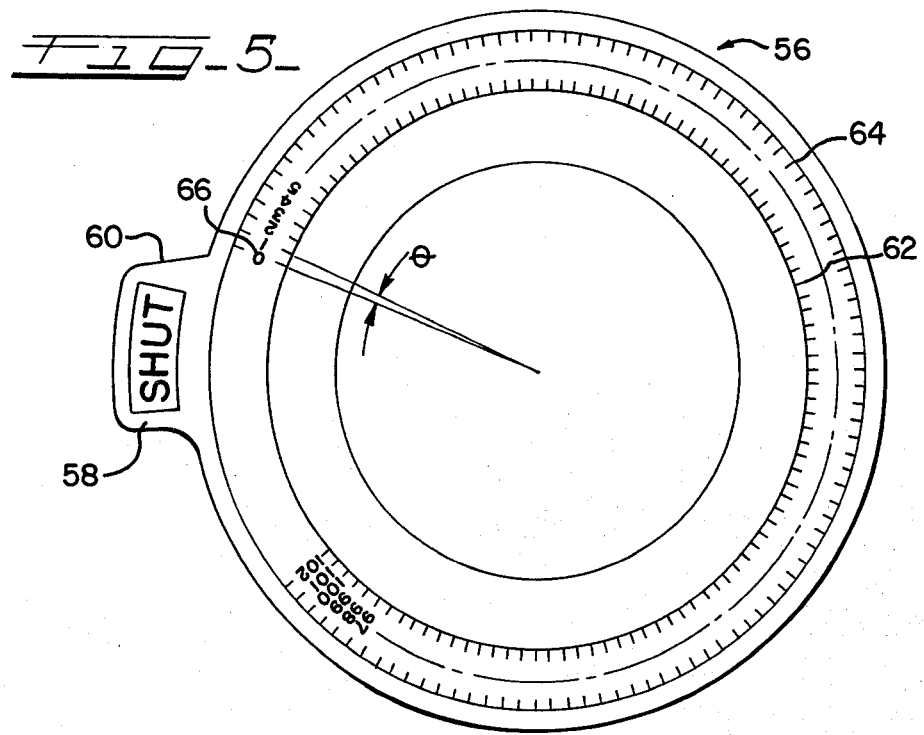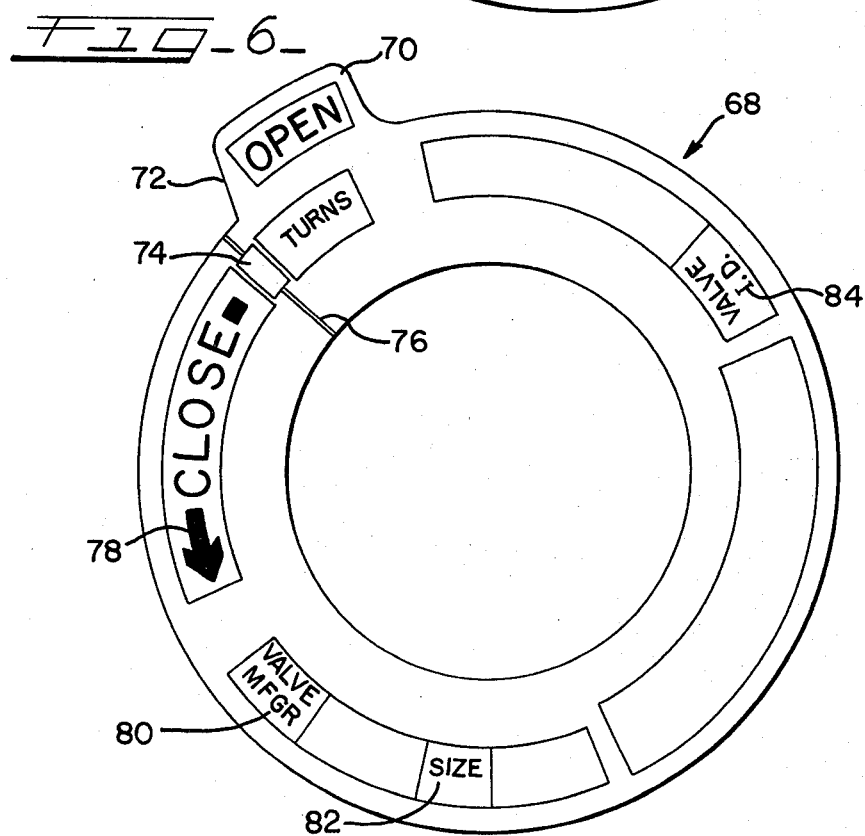

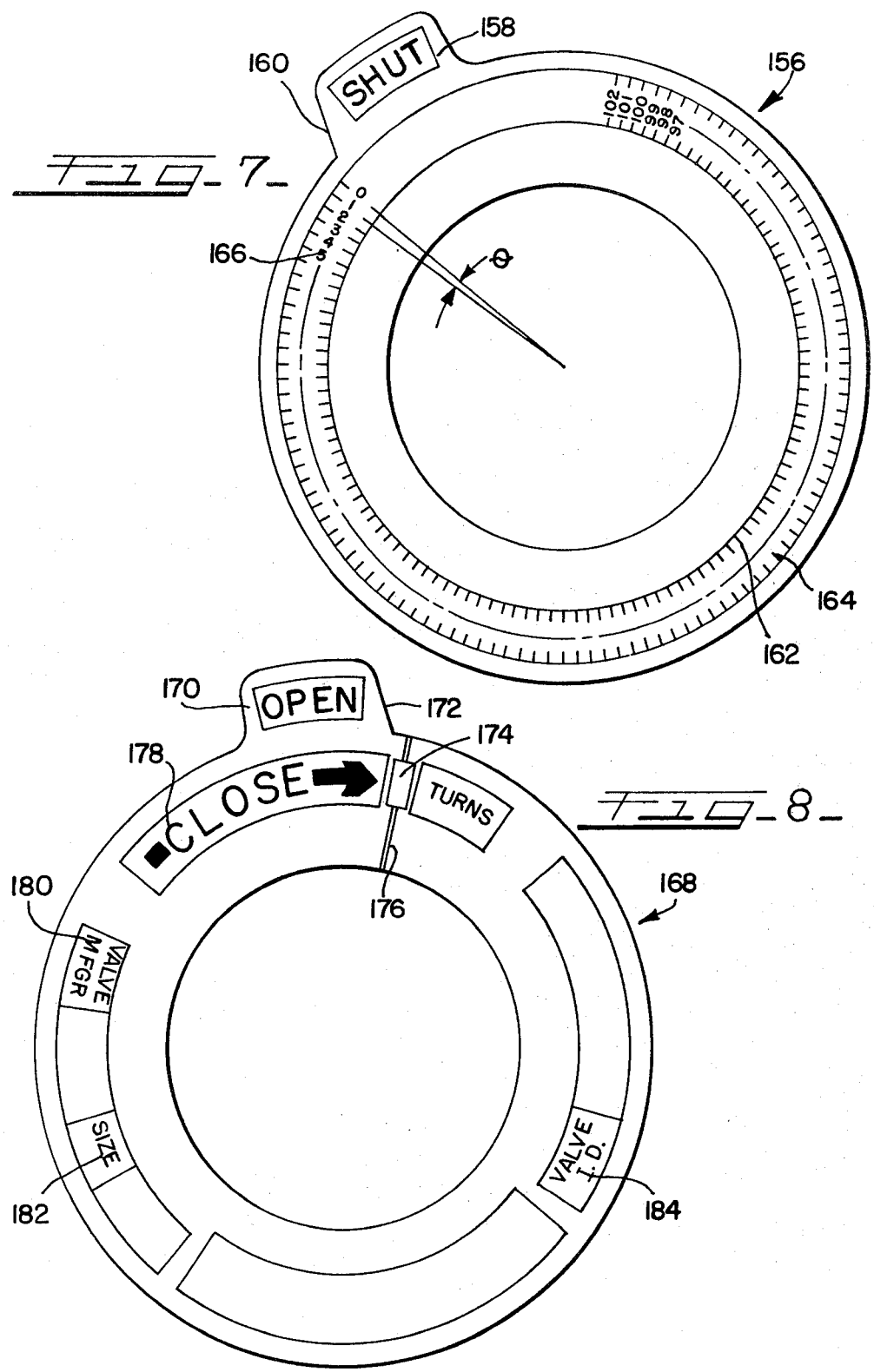

VALVE POSITION INDICATOR WITH VARIABLE INDICATOR PLATES

BACKGROUND OF THE INVENTION

1. Field of Invention

The present invention relates to a valve position indicator for a buried valve and more particularly to an adjustable gear box unit of the valve position indicator for application to valves requiring a different number and/or fractions of turns between the open and shut positions thereof.

2. Prior Art

The closing or opening of underground valves of the type to which the present invention relates is generally accomplished by turning an operator shaft extending to ground level from the buried valves. Such valves may have a valve position indicator located at the ground end of the operator shaft to indicate to the worker when a valve is fully open, shut, or intermediate positions. Representative but nonexhaustive of the prior art in the area of valve position indicator is U.S. Pat. No. 3,656,504.

Heretofore, indicator plates have been permanently incorporated on the cover of the gear box unit to provide a valve open reference point and a valve shut or closed reference point. The angular spacing between the two reference points is determined by the number and/or fraction of turns required to turn the valve between its open and shut positions, each such turn referred hereinafter as a shaft revolution. Therefore, a valve position indicator having the permanently incorporated pre-set indicator plates is limited for use on valves requiring the same number of shaft revolution to open and close the same.

SUMMARY OF THE INVENTION

In accordance with the present invention, the adjustable indicator plates are constructed for attachment to valves of different shaft revolutions. This is accomplished generally by a gear box unit including a first member having a radially and outwardly extending flag or tab establishing a shut position reference point, and a second member having an open position reference point adjustably positioned on the first member to provide an angular spacing between the open and shut reference points corresponding to the number of shaft revolutions.

The gear box unit may be provided with an indicating device that moves through a predetermined arc for each revolution of the operation shaft. A marker on the indicating device may be visible and movable between the open and shut reference points when the operator shaft is being rotated. When the marker is contiguous to one of the reference points, it indicates the valve is in the position shown on the reference point.

BRIEF DESCRIPTION OF THE DRAWINGS

FIG. 1 is a fragmentary elevational view in section of a preferred form of the combined operator and valve position indicator mounted within a valve box.

FIG. 2 is a fragmentary elevational view in section, similar to that of FIG. 1 showing the combined operator and valve position indicator mounted on top of a soil pipe.

FIG. 3 is a fragmentary sectional view taken substantially along the line 3—3 of FIG. 2.

FIG. 4 is a top plan view of the unit with the valve position indicator plates secured thereon.

FIG. 5 is a top plan view of a reference indicator plate for showing the closed position of the valve.

FIG. 6 is a top plan view of an reference indicator plate for showing the open position of the valve.

FIG. 7 is a top plan view embodiment of a reference indicator plate for designating the closed position of the valve.

FIG. 8 is a top view, a second embodiment of a reference plate used to designate the open position of a valve.

DESCRIPTION OF THE PREFERRED EMBODIMENT

Referring to FIG. 1 of the drawings, the valve position indicator and operator 11 of this invention is mounted on top of the pipe upright 13 and is connected with the valve operating shaft extension 15. A sealed gear box unit 10 is positioned inside an indicator housing 12 having a pair of downwardly facing shoulders 14 and 16 on the exterior side walls thereof. The upper shoulder 14 is designed for seating on a top ledge 18 of a valve box 20, as illustrated in FIG. 2. The lower shoulder 16 is of a size to fit on the top ledge 21 of a soil pipe 13 as shown in FIG. 1. A bolt 22 is threadably received in the lower portion of the indicator housing 12 with the head of the bolt on the inside thereof. The bolt is threadable into engagement with the inside of either the valve box 20 or the top of soil pipe 13 to secure the indicator housing 12 non-rotatably relative to the valve box or the soil and thus the valve buried below. The indicator housing 12 has in inwardly extending portion 24 terminating in an upwardly extending cylindrical portion 26 on which is seated a bearing 28 whereby the bearing engages the indicator housing 12 and the operator shaft 15 for transferring side loads from the shaft, through the housing 12 to valve box 20 or soil pipe 13.

The self contained, sealed gear box unit 10 has a transmission mechanism mounted about the operator shaft 15 to effectively move an indicating means, to be described in greater detail hereinafter, less than one turn for many turns of the shaft itself. In the embodiment illustrated in FIGS. 1, 2 and 3, this mechanism includes a center driving pinion gear 32 with a central, square or rectangular opening 34 therethrough to receive shaft 15 and turn with the shaft. The gear box unit 10 has upper and lower stationary annular parts 36 and 38 respectively, peripherally sealed to each other and movably sealed to the center drive pinion gear 32. The upper stationary annular part 36 comprises a transparent cover 37 for the gear box unit. A plurality of adjustable indicator plates are disposed on cover 37 to provide open and closed reference points of the valve, details of which to be described hereinafter. The lower stationary annular part 38 has a ring gear portion 40. An indicating ring gear 42 is positioned beneath the upper annular part 36 and is movable circumferentially of the gear box unit 10. A V-shaped marker 43 on the upper surface of the indicating ring gear 42 may be visible through cover 37 to indicate the movement of ring gear 42. The train of the drive from the center driving pinion gear 32 is through an intermediate idler gear 44 which is disposed between and in mesh with the pinion gear 32 and the outer ring gear 40 and 42.

In operation of the transmission mechanism described above, as nut 46 on top of shaft 15 is turned, the center drive pinion gear 32 is caused to rotate with shaft 15.

With the drive pinion gear 32 in mesh with idler gear 44, the idler gear is caused to revolve around the interior of the gear box unit 10, with the idler gear 44 in mesh with the stationary ring gear portion 40 of the lower stationary annular part 38 and in mesh with the movable indicating ring gear 42. The indicating ring gear 42 has one more tooth than the stationary ring gear 40, both of which are in mesh with idler gear 44. Therefore, as the idler gear makes one complete orbit around the inside of the stationary ring gear 40, it will cause the indicating ring gear 42 and the V-shaped marker 43 to revolve one tooth.

As shown in FIG. 4, the indicator housing 12 has flat vertical interior wall portions 48 and 50 and the gear box 10 has flat vertical complementary side walls 52 and 54 to mount the gear box unit 10 within the housing 12 non-rotatably.

Referring now to FIGS. 5 and 6, there is shown a first indicator plate 56 and a second indicator plate 68 respectively. Both plates may be manufactured of an opaque metal or non-metal material, such as mylar. First indicator plate 56 comprises an annular body fittable over transparent cover 37 and permitting the passage of shaft 15 through the center opening thereof. A radially and outwardly extending flag or tab 58 integrally formed on the body has a leading edge 60 formed at an angle complementary with an arm of the V-shaped marker 43 so as to provide visual alignment when one is contiguous to the other. A plurality of axially extending calibrations from an inner and outer band 62 and 64 respectively on indicator plate 56. The calibrations 62 and 64 are equally and angularly spaced from each other, each set of calibration is at 3° from the adjacent set shown at angle θ in FIG. 5. The 3° angle represents the arc of travel of marker 43 and the indicating ring gear 42 per shaft revolution. Numerals 66 in ascending order from 0 to 102 are displayed between each set of inner and outer calibrations 62 and 64 in a clockwise direction beginning with numeral "0" adjacent to leading edge 60. It is to be noted that plate 56 may accommodate numerals greater or less than 102 by modifying the angle θ between the calibrations. For instance, by increasing the diameter of pinion gear 32 or decreasing the diameter of idler gear 44, a greater number of turns of shaft 15 is required to cause idler gear 44 to orbit around the inside of the stationary ring gear 40, thus the arc of travel of indicating ring gear 42 will decrease, and the angle θ between the calibrations should be decreased accordingly to represent a shaft revolution.

FIG. 6 shows a second indicator plate 68 having an annular body of substantially similar inner and outer diameters as the first indicator plate 56. A radially and outwardly extending flag 70 integrally formed on the body has a leading edge 72 formed at an angle complementary with the other arm of the V-shaped marker 43. A rectangular window or opening 74 is formed on plate 68 of a size so as to permit one numeral 66 and the corresponding set of calibrations 62 and 64 of the first plate 56 viewable therethrough when second plate 68 is placed thereon. An alignment pointer 76 is located on plate 68 through the middle of the window 74 so as to provide alignment of one set of calibrations 62, 64 and the corresponding numeral 66 viewed through window 74. Indicia 78 on plate 68 indicates to the workman the direction to close the valve. Indicia 80, 82 and 84 on plate 68 identify the valve manufacturer, valve size and valve identification number respectively, inforation that can be filled out at site or at the time of valve installation.

In operation, first indicator plate 56 is secured to transparent cover 37 of an installed gear box unit 10 so that the apex of the V-shaped marker 43 is in alignment with the numeral "0". The leading edge 60 of flag 58 is now contiguous to one arm of marker 43.

The second indicator plate 68 is placed over the first plate 56 so that it overlaps a substantial portion of first plate 56 and may be rotatable about the same axis thereof. As illustrated in FIG. 4, plate 68 is selectively rotated until window 74 displays the numeral that represents the known shaft revolution of the valve, in this case, 30 revolutions between its open and closed positions. Plate 68 is then secured to plate 56.

As shaft 15 is turned clockwise to open valve, the center drive pinion gear 32 is caused to rotate with shaft 15. With the drive pinion gear 32 in mesh with idler gear 44, the idler gear 44 is caused to revolve around the interior of the gear box unit 10, with the idler gear 44 in mesh with the stationary ring gear portion 40 of the lower stationary annular part 38 and in mesh with the movable indicating ring gear 42. The indicating ring gear 42 has one more tooth than the stationary ring gear 40, both of which are in mesh with idler gear 44. Therefore, as idler gear 44 makes one complete orbit around the inside of the stationary ring gear 40, it will cause the indicating ring gear 42 and the V-shaped marker 43 to revolve one tooth. Therefore marker 43 travels gradually in a clockwise direction as shaft 15 is rotated to open valve in a clockwise direction. When the apex of marker 43 is in alignment with pointer 76 and the arm of marker 43 is in parallel alignment with leading edge 72 of flag 70, the valve indicator 11 indicates to the worker that shaft 15 has been rotated the number of revolutions shown in window 74 and the buried valve is in a fully open position.

It should be pointed out that valves may have the feature of either clockwise to open or clockwise to close, depending on the valve design. The indicator plates described above are embodiments adaptable for use with a clockwise to open valve. However, flags 58 and 70 may carry indicia open and shut respectively so as to be adaptable for use with a clockwise to close valve.

In this connection, FIGS. 7 and 8 illustrate a second embodiment of the invention adaptable for use with a clockwise to close valve, in which like parts bear like reference numerals. Indicator plate 156 carries a flag 158 having a leading edge 160 on the counter-clockwise side of flag 158. Numerals 166 arranged in an ascending order in a counter-clockwise direction begins with "0" located counter-clockwisely adjacent to leading edge 160. Indicator plate 168 carries flag 170 with the leading edge 172 along the clockwise edge of flag 170. Window 174 and alignment pointer 176 are located clockwisely adjacent the leading edge 172.

I claim:

1. In a valve position indicator for a buried valve having an operating shaft extending to ground level and requiring a predetermined number of turns to move said valve between the open and shut positions thereof, said position indicator including a housing mounted on the upper end of said extended operator shaft and having a transparent wall, an interior indicating member disposed in said housing so as to be visible through said transparent wall and operatively connected to said operating shaft and being incremental angularly displaced upon turning of said operator shaft to indicate the position of said valve relative to an open and closed position, the improvement comprising an annular first indicia bearing plate means coaxially disposed about said operator shaft and fixed to said transparent wall of said gear box unit, said first indicia means having a first reference tab means located relative to said interior indicating member to indicate one of said open or shut positions, an annular second indicia bearing plate means superimposed on said first member having a second reference tab means selectively angularly spaced from said first reference means of said first indicia bearing plate to indicate the other of said open or shut positions, said second indicia bearing plate means being disposed on said first indicia bearing plate means so that the angular spacing first reference tab means and said second tab means corresponds to the aggregate angular displacement of said interior indicating member between the open and closed positions of said valves upon turning said operator shaft the predetermined number of turns.

2. The invention as defined in claim 1 wherein said indicia on said first indicia bearing plate means comprises a plurality of equi-angularly spaced and radially extending lines having a spacing corresponding to the angular displacement of said interior indicator member caused by a selected number of rotations of said operating shaft, and said indicia lines are sequentially numbered commencing with the numeral zero, and wherein said numeral zero is located to designate one of the open and closed positions thereof.

3. The invention as defined in claim 2 wherein said equi-angularly spaced lines are spaced a distance corresponding to the angular displacement of said interior indicator member caused by one compete rotation of said operator shaft.

4. The invention as defined in claim 3 wherein said second indicia bearing plate means comprises a window formed therein so as to render the indicia on said first indicia bearing plate visible, and wherein a reference marker is located on said second indicia bearing plate aligned with one of the numerals on said underlying indicia to indicate the number of rotations required to move said valve between said open and closed positions.

* * * * *